United States Patent [19]

Strychewski

[11] Patent Number: 5,273,430

[45] Date of Patent: Dec. 28, 1993

[54] MATHEMATICAL EDUCATION GAME APPARATUS

[76] Inventor: Richard E. Strychewski, P.O. Box 203, 3314 Hemlock Cir., Mechanicsville, Pa. 18934

[21] Appl. No.: 999,270

[22] Filed: Dec. 31, 1992

[51] Int. Cl.⁵ .............................................. G09B 19/22
[52] U.S. Cl. ...................................... 434/128; 434/188; 273/145 B
[58] Field of Search ....................... 434/128, 188, 191; 273/145 B, 145 R, 268

[56] References Cited

U.S. PATENT DOCUMENTS

D. 144,115  3/1946  Kastner ........................... 273/145 B

FOREIGN PATENT DOCUMENTS 2557804  7/1985  France .............................. 273/268
2154148  9/1985  United Kingdom ................. 273/268

*Primary Examiner*—Gene Mancene
*Assistant Examiner*—Jeffrey A. Smith
*Attorney, Agent, or Firm*—Leon Gilden

[57] ABSTRACT

A game board includes a plurality of circular areas, each having a circular array of wedge-shaped segments to receive a circular overlay, wherein the segments may have a number indicated thereon or the overlay may be provided to indicate arbitrary numbers, wherein a plurality of dice are employed, with individuals mathematically computing employing addition, subtraction, division, and multiplication to calculate a final summation indicated by the dice to indicate a predetermined number of one of the segments, wherein a token member is positioned over a segment to indicate a correct total thusly derived. Each player is afforded various time intervals to assemble a correct total.

1 Claim, 4 Drawing Sheets

FIG. 8
FIG. 9
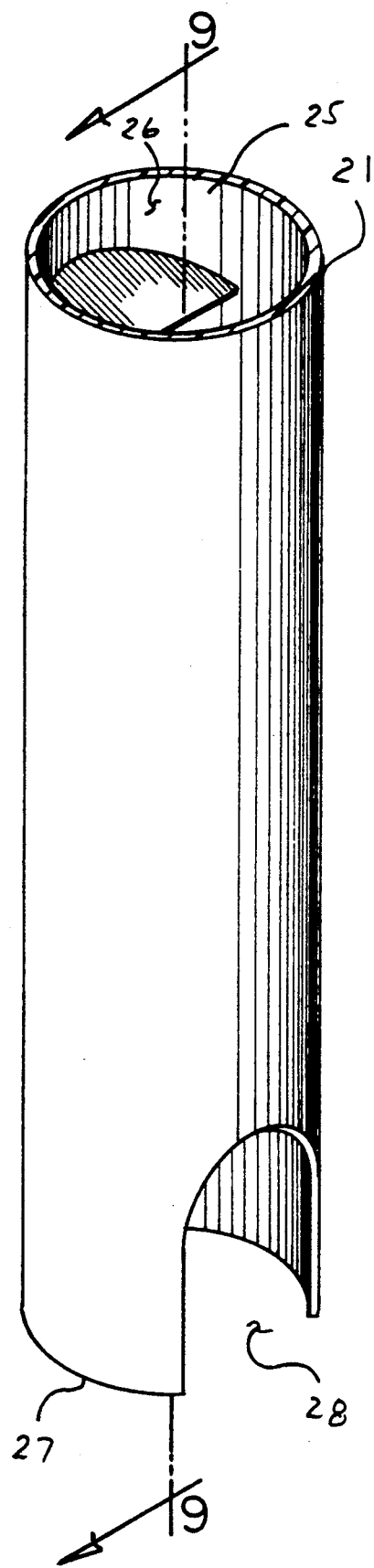
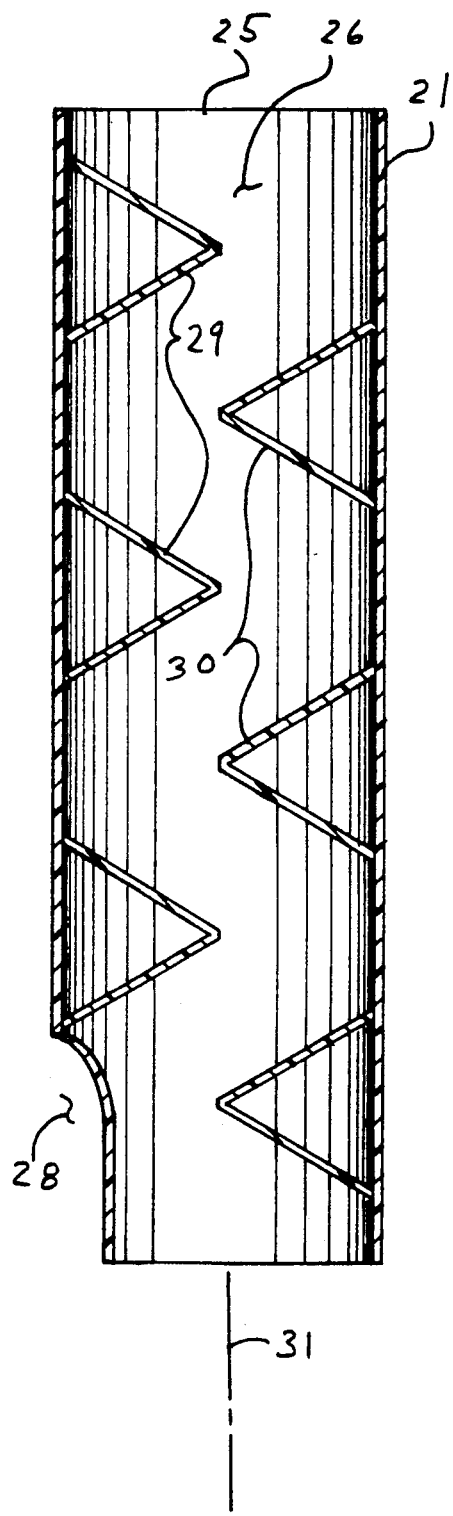

MATHEMATICAL EDUCATION GAME APPARATUS

BACKGROUND OF THE INVENTION

1. Field of the Invention

The field of invention relates to game apparatus, and more particularly pertains to a new and improved mathematical education game apparatus wherein the same is directed to the development of mathematical skills.

2. Description of the Prior Art

Game apparatus of various types are utilized in the prior art for education and entertainment purposes such as indicated in the U.S. Pat. Nos. 4,561,658; 3,425,139; 4,219,196; 4,258,922; and 4,360,347.

The instant invention attempts to overcome deficiencies of the prior art by providing for a mathematical game to address the development of mathematical skills, particularly in the addition, subtraction, division, and multiplication aspect of mathematics.

SUMMARY OF THE INVENTION

In view of the foregoing disadvantages inherent in the known types of game apparatus now present in the prior art, the present invention provides a mathematical education game apparatus wherein the same is arranged to direct individuals to employ base numbers and manipulate the base numbers to derive a predetermined total relative to such predetermined totals indicated upon segments of the game board. As such, the general purpose of the present invention, which will be described subsequently in greater detail, is to provide a new and improved mathematical education game apparatus which has all the advantages of the prior art game apparatus and none of the disadvantages.

To attain this, the present invention provides a game board including a plurality of circular areas, each having a circular array of wedge-shaped segments to receive a circular overlay, wherein the segments may have a number indicated thereon or the overlay may be provided to indicate arbitrary numbers, wherein a plurality of dice are employed, with individuals mathematically computing employing addition, subtraction, division, and multiplication to calculate a final summation indicated by the dice to indicate a predetermined number of one of the segments, wherein a token member is positioned over a segment to indicate a correct total thusly derived. Each player is afforded various time intervals to assemble a correct total.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved mathematical education game apparatus which has all the advantages of the prior art game apparatus and none of the disadvantages.

It is another object of the present invention to provide a new and improved mathematical education game apparatus which may be easily and efficiently manufactured and marketed.

It is a further object of the present invention to provide a new and improved mathematical education game apparatus which is of a durable and reliable construction.

An even further object of the present invention is to provide a new and improved mathematical education game apparatus which is susceptible of a low cost of manufacture with regard to both materials and labor, and which accordingly is then susceptible of low prices of sale to the consuming public, thereby making such mathematical education game apparatus economically available to the buying public.

Still yet another object of the present invention is to provide a new and improved mathematical education game apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 8 is an enlarged isometric illustration of the housing structure of the dice scrambler member.

FIG. 9 is an orthographic view, taken along the lines 9—9 of FIG. 8 in the direction indicated by the arrows.

DESCRIPTION OF THE PREFERRED EMBODIMENT

Figure 1:
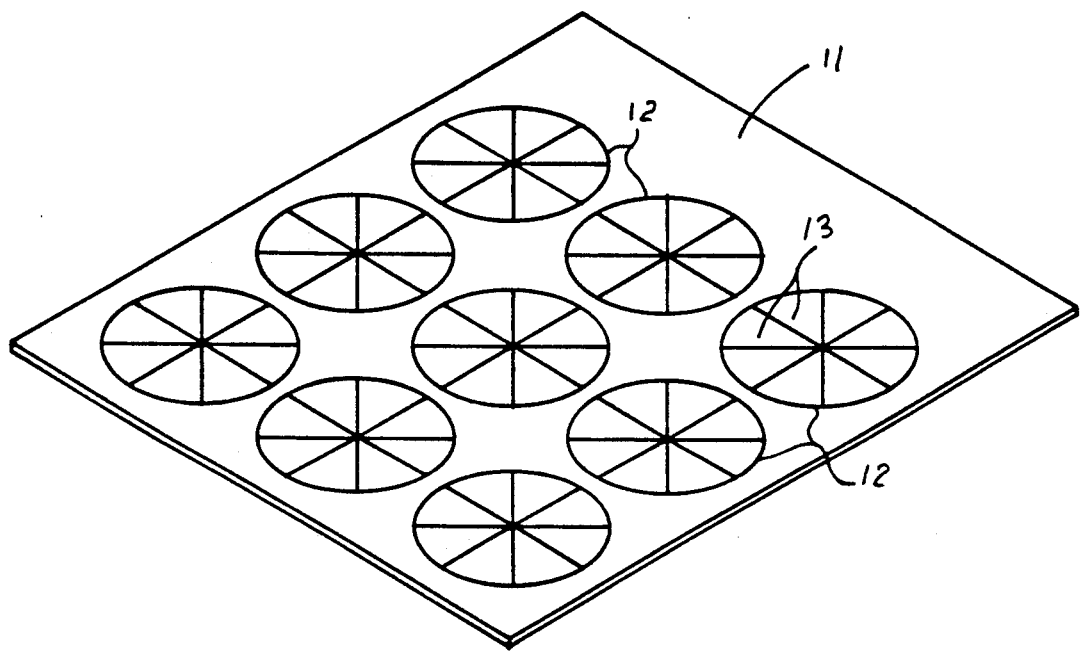
FIG. 1 is an isometric illustration of the game board structure of the invention.
Figure 2:
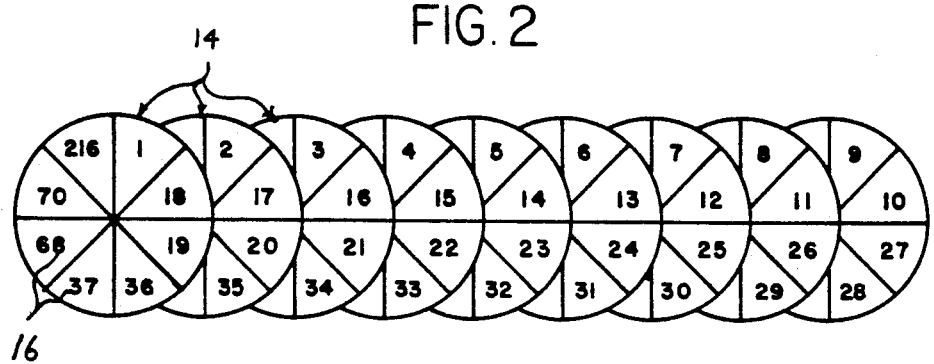
FIG. 2 is an orthographic top view of the various overlay members of the invention.

With reference now to the drawings, and in particular to FIGS. 1 to 9 thereof, a new and improved mathematical education game apparatus embodying the principles and concepts of the present invention and generally designated by the reference numerals 11–32 will be described.

Figure 3:
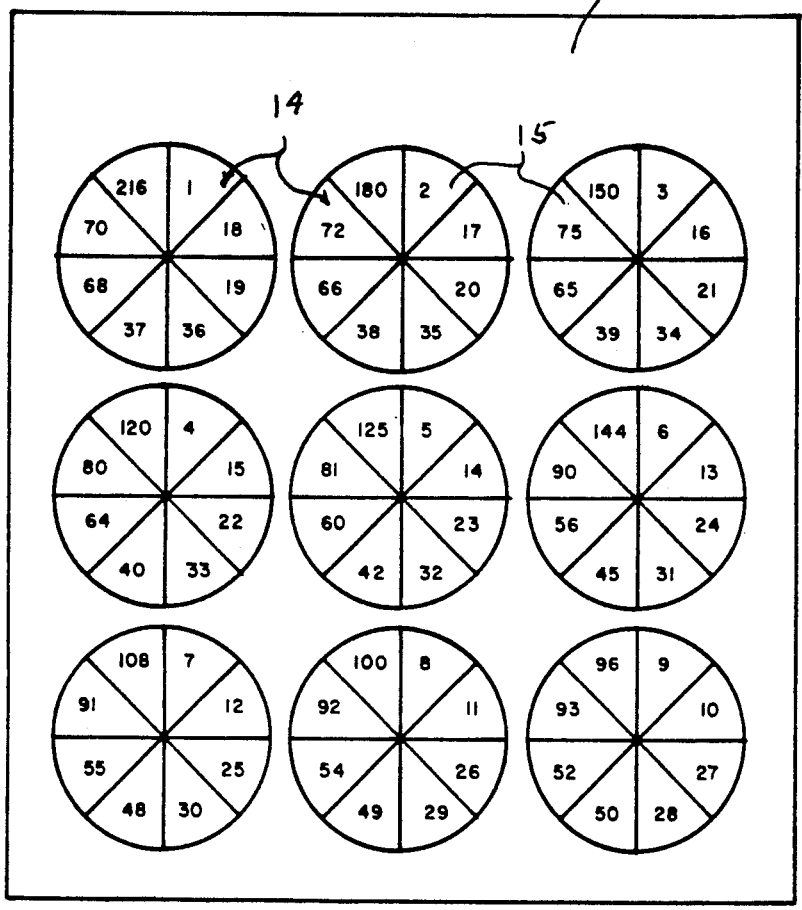
FIG. 3 is an orthographic view of the overlay members positioned upon the game board.

More specifically, the mathematical education game apparatus of the instant invention includes a game board 11, having an erasable top surface, the erasable top surface including a plurality of spaced circular areas 12, each having a circular array of wedge-shaped segments 13, wherein an individual may inscribe various predetermined numbers thereon. Alternatively, the game apparatus is arranged to include a plurality of circular overlays 14, with at least an equal number of circular overlays 14 relative to the circular areas 12. Each of the circular overlays 14 is of a complementary configuration relative to the circular areas 12, and includes an annular array of overlay segments 15, with each of the segments having a random predetermined number positioned therewithin to indicate the randomly numbered wedge-shaped segments 16 of FIG. 2. In this manner, the overlays are positioned upon the circular areas 12, in a manner as indicated in FIG. 3 for example. A plurality of dice members 17 are provided, with also plural sets of token members 18, with a set of token members 18 afforded each player.

Figure 4:
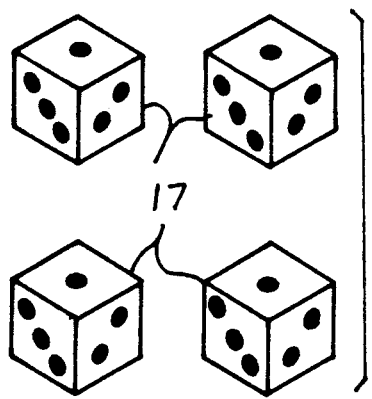
FIG. 4 is an isometric illustration of the dice members employed by the invention.
Figure 5:
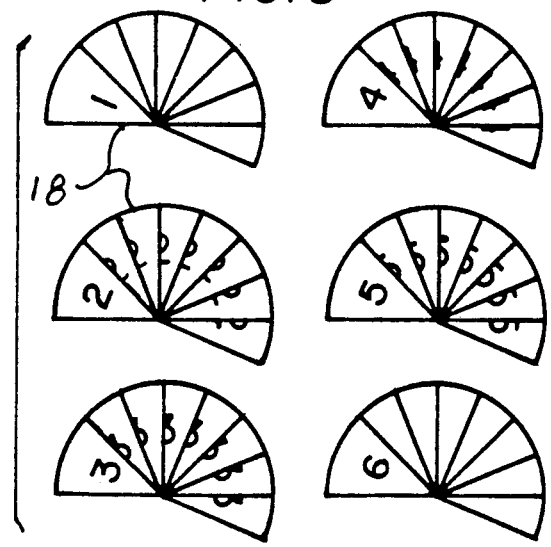
FIG. 5 is an orthographic-top view of the various token members presented each player.

In play of the game, a predetermined segment of the segments 16 is indicated by a moving player, whereupon rolling of the dice member 17, the dice members generate the random numbers, in a manner as indicated in FIG. 4. The individual numbers indicated by the dice members are then subject to mathematical manipulation employing division, subtraction, addition, and multiplication. For example, should a player indicate the number 42 of one of the segments as a number to be obtained, and in rolling of the dice members 17, the numbers 1, 3, 4, and 6 are generated. The player may then square the number 6 to obtain thirty-six, then add the number 3 and the number 4 to obtain a total of forty-three, then subtract the remaining dice generated number 1 to provide the total of forty-two. Upon thusly obtaining number forty-two, a token member 18 is then positioned upon the correctly noted space as a captured space. Upon correct response by a moving player, that turn is lost and a next player rolls the dice. The players may be afforded arbitrary time sequences for obtaining a proper response.

To initiate play, the players may roll the four dice to provide for sequential hierarchy of play by the players by the use of descending numbers obtained by the total of the dice. An object of the game is for a player to cover one complete circle with that player's tokens. In that game, a player may only call out numbers in a circle of the preselective circular overlays 14 to include only those segments 15 and only those numbered portions 16 in those segments. Alternate methods may be employed such as the greatest number of segments covered by anyone of the players. To this end, any player to cover thirty-six of the typical seventy-two wedge-shaped segments 16 may be declared a winner. It should be therefore contemplated that by way of example, the above noted manner of the players employing the game and play of the game are presented, but it should be understood that these examples are not to be construed as limiting as players may devise alternative manners of employing the structure of the instant invention.

Figure 6:
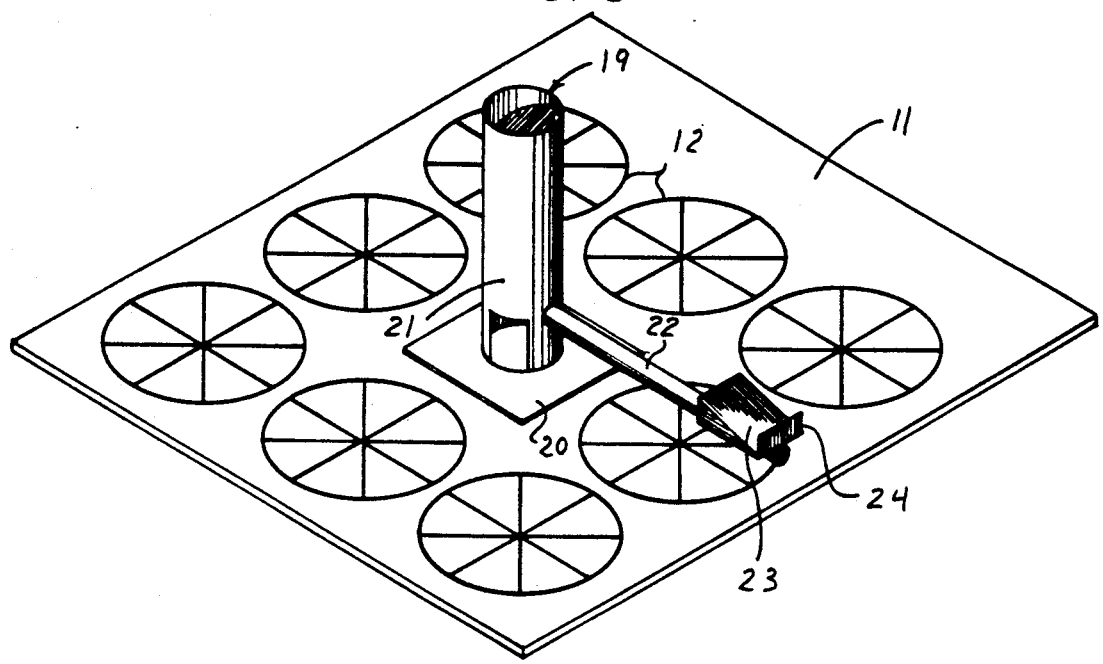
FIG. 6 is an isometric illustration of the invention employing a dice scrambling member.
Figure 7:
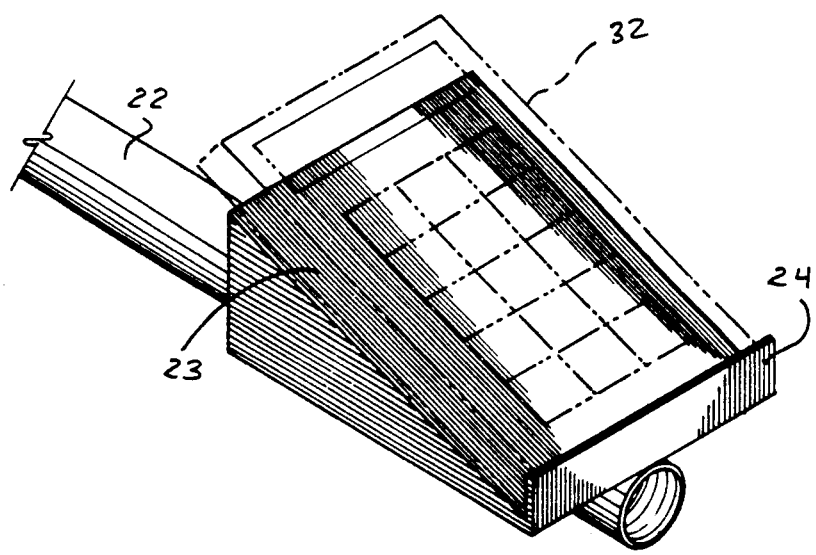
FIG. 7 is an isometric enlarged illustration of the calculator support structure of the invention.

The FIG. 6 indicates the use of a dice scrambling member 19 to be optionally employed by the invention, having a support plate 20, with a cylindrical housing 21 fixedly and orthogonally mounted to the housing lower end 27 defining an intersection with the support plate 20. The cylindrical housing 21 includes a housing tubular cavity 26, with a housing entrance end 25 directed at an uppermost end of the housing, with a housing exit opening 28 directed through the housing at the intersection with the support plate 20. A support arm 22 is fixedly mounted to the exterior surface of the cylindrical housing 21 to include an arm plate 23, that in turn includes an abutment flange 24. A calculator 32 is arranged for positioning thereby upon the support arm plate 23 in engagement with the abutment flange 24 to provide for a manner of checking mathematical totals derived by individual players in play of the game.

Within the tubular cavity 26 are rows of respective first and second baffles 29 and 30 respectively, wherein the first and second baffles 29 and 30 are positioned on diametrically opposed sides of the housing 21 within the cavity 26. The first and second baffles 29 and 30 are offset relative to one another, whereupon dice members directed into the entrance end 25 direct the dice members to sequentially engage the downwardly canted baffles 29 and 30 to direct the dice members 17 from the exit opening 28 and rotate the dice members in their descent through the cavity 26 and their projection through the exit opening 28 to thereby scramble in a random manner the dice members to generate the dice member numbers. The housing is in this manner symmetrically oriented about a housing axis 31, wherein as noted in FIG. 9, the first and second baffles 29 and 30 are positioned on opposed sides of the housing axis 31 in the offset manner relative to one another.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A mathematical education game apparatus, comprising,
   a game board, the game board having an erasable top surface, the top surface including a predetermined number of spaced circular areas having a predetermined configuration, and
   each of the circular areas having a circular array of wedge-shaped segments, with each of the wedge-shaped segments arranged for reception of a predetermined random number to be imparted upon the top surface, and
   a plurality of die members for generating random individual dice member numbers, wherein each of a plurality of players sequentially employ the dice number members to generate a preselected one of the predetermined random number as indicated within the segments, and
   each of the players is awarded a set of token members, whereupon a token member is positioned within one of said segments upon the correct mathematical generation of the dice member numbers to equate to said predetermined number within a preselected one of said segments, and
   a plurality of circular overlays, each of said circular overlays having said predetermined configuration, and each of said circular overlays having an array of overlay wedge shaped segments, wherein each of the overlay segments includes a segment number, and
   a dice scrambling member, the dice scrambling member includes a support plate arranged for mounting upon the top surface of the game board, with a cylindrical housing fixedly and orthogonally mounted to the support plate, the cylindrical housing including an entrance end and a lowermost end having a housing cavity extending therebetween, with the lowermost end in fixed communication of the support plate defining an intersection, with an exit opening directed through the cylindrical housing at the intersection, and an entrance opening at the entrance end in communication with the tubular housing, with the housing cavity directed through the housing in communication with the entrance opening and the exit opening, and a row of first baffles and a row of second baffles mounted within the cavity, and the cylindrical housing symmetrically oriented about a housing axis, the housing axis orthogonally oriented relative to the support plate, with the row of first baffles mounted to a first side of the housing axis, and the row of second baffles mounted to a second side of the housing axis, wherein the first baffles and the second baffles are offset relative to one another to provide for an undulating path through the cavity from the entrance opening to the exit opening, and
   a support arm fixedly mounted to the cylindrical housing, the support arm having an arm plate fixedly mounted to the support arm spaced from the housing, the support plate including an abutment flange, and a calculator arranged for mounting upon the support plate in communication with the abutment flange.

* * * * *